US009656501B2

(12) United States Patent
Zhou et al.

(10) Patent No.: US 9,656,501 B2
(45) Date of Patent: May 23, 2017

(54) COATING COMPOSITIONS

(75) Inventors: Xiaoqi Zhou, San Diego, CA (US); Gracy Apprisiani Wingkono, San Diego, CA (US); David Edmondson, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 959 days.

(21) Appl. No.: 13/383,099

(22) PCT Filed: Jul. 31, 2009

(86) PCT No.: PCT/US2009/052510
§ 371 (c)(1),
(2), (4) Date: Jan. 9, 2012

(87) PCT Pub. No.: WO2011/014199
PCT Pub. Date: Feb. 3, 2011

(65) Prior Publication Data
US 2012/0123027 A1    May 17, 2012

(51) Int. Cl.
| | | |
|---|---|---|
| C09D 103/00 | (2006.01) | |
| D06M 15/03 | (2006.01) | |
| B41M 5/52 | (2006.01) | |
| C09D 101/26 | (2006.01) | |
| C09D 103/02 | (2006.01) | |
| C09D 103/04 | (2006.01) | |
| C09D 103/08 | (2006.01) | |
| C09D 105/04 | (2006.01) | |
| C09D 121/02 | (2006.01) | |
| C09D 189/00 | (2006.01) | |
| D21H 19/36 | (2006.01) | |
| D21H 19/54 | (2006.01) | |
| D21H 19/60 | (2006.01) | |
| C08L 23/20 | (2006.01) | |
| C08L 25/08 | (2006.01) | |
| C08L 27/06 | (2006.01) | |
| C08L 29/04 | (2006.01) | |
| C08L 31/04 | (2006.01) | |
| C08L 33/08 | (2006.01) | |
| C08L 33/20 | (2006.01) | |
| C08L 67/00 | (2006.01) | |

(52) U.S. Cl.
CPC ........ B41M 5/5254 (2013.01); B41M 5/5245 (2013.01); C09D 101/26 (2013.01); C09D 103/02 (2013.01); C09D 103/04 (2013.01); C09D 103/08 (2013.01); C09D 105/04 (2013.01); C09D 121/02 (2013.01); C09D 189/00 (2013.01); C09D 189/005 (2013.01); D21H 19/36 (2013.01); D21H 19/54 (2013.01); D21H 19/60 (2013.01); C08L 23/20 (2013.01); C08L 25/08 (2013.01); C08L 27/06 (2013.01); C08L 29/04 (2013.01); C08L 31/04 (2013.01); C08L 33/08 (2013.01); C08L 33/20 (2013.01); C08L 67/00 (2013.01); C08L 2205/03 (2013.01)

(58) Field of Classification Search
CPC ... B41M 5/5245; B41M 5/5254; D21H 19/50; D21H 19/54; D21H 19/60; C09D 189/005; C09D 121/02; C09D 105/04; C09D 103/08; C09D 103/02; C09D 103/04; C09D 101/26; C08L 29/04
USPC ...................... 524/25, 27, 28, 42, 47, 52, 53
See application file for complete search history.

(56) References Cited

U.S. PATENT DOCUMENTS

| | | | |
|---|---|---|---|
| 3,714,086 A * | 1/1973 | Schaefer et al. ................. | 524/45 |
| 6,447,883 B1 | 9/2002 | Chen et al. | |
| 6,472,053 B1 | 10/2002 | Hoshino et al. | |
| 6,677,007 B1 | 1/2004 | Warner et al. | |
| 6,977,100 B2 | 12/2005 | Kondo et al. | |
| 6,984,423 B2 | 1/2006 | Iida et al. | |
| 7,250,202 B1 | 7/2007 | Steiger | |
| 7,387,381 B2 | 6/2008 | Katoh et al. | |
| 2002/0025413 A1* | 2/2002 | Ohbayashi ............... | B41M 5/52 428/32.1 |
| 2004/0080595 A1 | 4/2004 | Taguchi et al. | |
| 2006/0013971 A1 | 1/2006 | Chen et al. | |
| 2006/0084013 A1* | 4/2006 | Itakura et al. ................. | 430/434 |
| 2006/0115612 A1 | 6/2006 | Nakata et al. | |
| 2006/0223002 A1* | 10/2006 | Yanaka ...................... | 430/270.1 |
| 2007/0196598 A1* | 8/2007 | Koike ...................... | B41M 5/52 428/32.34 |
| 2008/0008846 A1 | 1/2008 | Zhou et al. | |

(Continued)

FOREIGN PATENT DOCUMENTS

| | | |
|---|---|---|
| CN | 1181402 | 5/1998 |
| CN | 1224742 | 8/1999 |
| EP | 0759365 | * 2/1997 |

(Continued)

OTHER PUBLICATIONS

European Search Report dated Dec. 3, 2013 for Application No./ Patent No. 09847940.5-1704/2459663, PCT/US2009052510, Applicant Hewlett-Packard Development Company, L.P.

(Continued)

Primary Examiner — Wenwen Cai
(74) Attorney, Agent, or Firm — Thorpe, North & Western L.L.P.

(57) ABSTRACT

A coating composition includes pigments or a mixture of pigments, a surface active substance and a metal containing polymeric complex. The metal containing polymeric complex contains a metallic salt, a polymeric latex and polyvinyl alcohol (PVA), wherein the polyvinyl alcohol has a molecular weight ranging from about 10,000 to about 65,000.

18 Claims, No Drawings

(56) References Cited

U.S. PATENT DOCUMENTS

2009/0023085 A1* 1/2009 Tsuchimura .................. 430/7

FOREIGN PATENT DOCUMENTS

| EP | 0759365 A1 | 2/1997 |
| EP | 1398165 | 3/2004 |
| EP | 0759365 B2 | 3/2006 |
| WO | 03031191 | 4/2003 |

OTHER PUBLICATIONS

Int'l Search Report—3 pgs, May 3, 2010, Hewlett-Packard Development Company, L.P.

* cited by examiner

COATING COMPOSITIONS

BACKGROUND

Commercial digital printing, such as high speed inkjet web printing, is rapidly replacing traditional impact printing or "plate" printing methods such as offset printing. Indeed, inkjet printing is nowadays becoming a popular way of recording images on various media surfaces, particularly paper, for a number of reasons, including, better colored image quality, capability of high-speed recording, and cost competitive. In this printing method, print media play a key role in the overall image quality and permanence of the printed images. Thus, it has often created challenges to find media which can be effectively used with such printing techniques.

In view of obtaining a superior image quality, a coated media is typically used. Such media has single or multiple image-receiving layers which are disposed onto a media substrate. Typically, the image-receiving layer is made of a coating composition which includes inorganic or organic pigments as the filler and polymeric materials as the binder, along with other functional materials. The image-receiving layer usually promotes performance of the ink receiving properties of the media such as the image quality, ink dry time and capacity for duplex. It also improves the sheets quality of the printing media. For example, the coated media show superior physical properties over uncoated media in terms of paper physical appearance such as gloss and surface smoothness. When the low cost media substrates such as the cellulose substrates, containing wood pulps are used, the image receiving layer can enhance the sheet whiteness and brightness significantly, and can also function as the barrel layer for anti-yellowing.

Coating compositions, adapted for printing papers, often include a white pigment and a binder. The function of the binder is, mainly, by forming a continuous film, to bond the pigment particles together, as well as to bind the pigments particles to the base substrate.

More often, binders, in paper coating, are negatively charged latexes (forming anionic polymers latexes) and are thus compatible with negatively charged pigments slurry without causing any precipitation of the slurry when mixed together. Examples of such binders are synthetic polymer emulsions such as styrene butadiene latexes (SBR), carboxylated SBR, styrene acrylate latexes (acrylate latex) and polyvinyl acetate latexes (PVAc).

When paper is used for inkjet printing, it is highly desirable that image receiving papers not only meet the common requirements for printing media, but also functionalize to improve inkjet characters with fast ink drying, high optical density, minimal spread (feathering or bleed) and sharp or clean edges (wicking or line edge raggedness). Though the above list of characteristics provides a worthy goal to achieve, there are difficulties associated with satisfying all of the above characteristics. Accordingly, investigations continue into developing coating formulations that provides high quality printing media.

Surface characteristics of the printing paper have a primary influence on qualities of ink jet printing. To this end, ink fixative is often included into coating compositions and applied onto paper surface. However, ink fixative is often an electrolyte from which the cationic ions adversely impact the stability of negatively charged binders (anionic polymers). Indeed, ink fixative can precipitate binders and then resulting in coating composition that cannot be coated.

DETAILED DESCRIPTION

Before particular embodiments of the present invention are disclosed and described, it is to be understood that the present invention is not limited to the particular process and materials disclosed herein as such and may vary to some degree. It is also to be understood that the terminology used herein is used for the purpose of describing particular embodiments only and is not intended to be limiting, as the scope of the present invention will be defined only by the appended claims and equivalents thereof. In describing and claiming the present exemplary composition and method, the following terminology will be used: the singular forms "a," "an," and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. As another example, a range of 1 part to 20 parts should be interpreted to include not only the explicitly recited concentration limits of about 1 part to about 20 parts, but also to include individual concentrations such as 2 parts, 3 parts, 4 parts, etc. All parts are dry parts in unit weight, with the sum of the inorganic pigment equal to 100 parts, unless otherwise indicated.

The present disclosure relates to a coating composition, to media including the coating composition and to methods to make and use such media and coating composition. In an embodiment of the present invention, the coating composition is an ink receiving coating composition. In another embodiment, the coating composition is used to form an image-receiving layer on a media substrate. In an embodiment, such combination of coating composition and a substrate forms a media sheet having improved printing characteristics.

The coating composition, according to embodiments of the present disclosure, includes: pigments or a mixture of pigments, a surface active substances and a metal containing polymeric complex. Such polymeric complex is formed from, at least, a metallic salt, a polymeric latex and a polyvinyl alcohol (PVA) which has a molecular weight in the range of from about 10,000 to about 65,000.

The coating composition, according to embodiments of the present disclosure, when used to form an image-receiving layer on a media substrate, increases the ink optical density and color saturation of the image which is printing on the media substrate containing embodiments of the coating composition. Furthermore, the coating composition, according to embodiments of the present invention, when used to form an image-receiving layer on a media substrate, reduces the dry time of such media when compared with standard offset printing media.

In an embodiment, the coating composition, when used to form an image-receiving layer on a media substrate, improves the overall print quality by sharpening dot edge. Further, in an embodiment, the coating composition improves the physical qualities of the printing media, including but not limited to, surface smoothness, whiteness, brightness and anti-yellowing.

According to an embodiment of the present disclosure, the coating composition includes pigments. In an embodiment, such pigments are water insoluble pigments or are pigments which are slightly soluble in water. In another embodiment, such pigments are white pigments or white pigments mixture. There is no special limitation for the chemical composition of the pigments as long as its rheological characteristics, when dispersed into coating formulation, can make the coating solution coatable under designed coating machine. The rheology characteristics refer herein to the viscosity, solid content and thixotropic index of the coating solution.

In an embodiment, the pigments or a mixture of pigments are in the form of a pigment slurry or pigment dispersion. In an embodiment of the present invention, the pigment is present in the composition in an amount ranging from about 10% to about 95% by total dry weight of the coating composition. In another embodiment, the total amount of pigments ranges from about 50% to about 85% by total dry weight of the coating composition. The dry weight is the weight of the final coating weight not including solvent (or water) used in the making of the coating solution itself.

The pigments, according to an embodiment of the present invention, are inorganic pigments or organic pigments. In an embodiment, the pigments are organic pigments. Non limited examples of organic pigments include: styrene-type plastic pigment, acrylic-type plastic pigment, polyethylene, polymethyl methacrylate, polystyrene and its copolymers, polytetrafluoroethylene (Teflon®) powders, and any combinations of thereof. Other examples of organic pigments include, but are not limited to, microcapsules, urea resin, melamine resin, or the like. The organic pigments can be in a form of solid particles or in a form called "hollow" particles, in other words, where void volumes are present in the particles. In another embodiment, pigments are inorganic pigments. Non limited examples of inorganic pigments include: calcium carbonate, kaolin, talc, calcium sulfate, barium sulfate, titanium dioxide, zinc oxide, zinc sulfide, zinc carbonate, satin white, aluminum silicate, diatomite, calcium silicate, magnesium silicate, synthetic amorphous silica, colloidal silica, colloidal alumina, pseudo-boehmite, aluminum hydroxide, alumina, lithopone, zeolite, magnesium carbonate, magnesium hydroxide, and various combinations thereof. In another embodiment, inorganic pigments are selected from the group consisting of silica, clay, kaolin, calcium carbonate, talc, titanium dioxide, and zeolites. In another embodiment, pigments are inorganic pigment particles received in a dry-powder form or in a form of an aqueous suspension, often referred as slurry. In another embodiment, the inorganic pigments have a lower bulky density. Indeed, the media weight per unit area is thus low since, when media is used for commercial printing media, the lighter weight media under similar thickness is beneficial for shipping cost. The density range of the inorganic pigments ranges from about 1.5 to 3.5 kg/cm$^3$, and, in another embodiment, in the range of from about 2.0 to 2.9 kg/cm$^3$.

In another embodiment, the inorganic pigments are selected from the inorganic pigments with high brightness and whiteness, especially when the coating composition is used for the printing media based on low brightness/whiteness wood mechanical pulps such as grounded wood pulps, TMP (thermo-mechanical pulps), CTMP (chemo-thermo-mechanical pulps) or hybrid pulps of mechanical and chemical pulp mixture. In another embodiment, the inorganic pigments are selected from the fillers with TAPPI brightness ranging from about 75 to about 100, and, in another embodiment, ranging from about 84 to about 100.

In another embodiment, the inorganic pigments are selected from those with fine particle size to improve surface properties of coated media like smoothness and gloss, and enhance printing quality. In an embodiment, the filler particles have a particles size which is smaller than 5 micrometer and represents more than about 80% of the inorganic pigments; in another embodiment, represents more than about 85%, and, in another embodiment, more than about 92%.

In another embodiment, the inorganic pigments have low surface area to reduce viscosity of coating composition at high solid content. There is no specific requirement for surface area of pigments. However, in another embodiment, the pigments have a low share viscosity. With no less than about 70% of solid content, the viscosity of inorganic pigment slurry, at 100 rpm, is no more than 800 centipoise, as measured by a Brookfield viscometer.

For print media used in high speed inkjet web printing, the capability to absorb of the aqueous liquid in the inkjet inks is an important parameter to achieve a satisfactory image quality. The absorption capability is directly related to the porosity of the base paper and the coating structure which is related to the coating composition and the coating method. Porosity is the measurement of the total connecting air voids, both vertical and horizontal, that exists in a printing paper. Porosity of the paper is an indication of absorptivity or the ability of the sheets to accept ink. In practice, the paper porosity can be represented by measuring the air resistance of the papers using the method defined in TAPPI "Air Permeance of Paper (Sheffield Method)", Test Method T 547 om-07. This method is used to measure the Porosity by forcing air through paper, measuring the rate of the flow. The results are reported as the Sheffield unit.

Pigmented coatings can vary widely in the porosity depending on the pigment types, particle size and distribution, binder type and amount, coating conditions and post-coating processing such as calendaring. In embodiments of the present disclosure, the final paper porosity is specifically required and adjusted from coating composition and coating/post coating processing. A coated paper with lower volume of voids indicates poor porosity which may cause extended dry time and result smear and ink bleeding issues during printing. An excessively high voids value, however, presents an overly porous structure, which may absorb the majority of the ink colorant into the base paper, thereby generating low optical density (fading) images. The porosity of the final, finished coated paper as represented by air permeance, according to embodiment of the present disclosure is in the range of from 15 to 40 Sheffield unit Parker Print-Surf tester.

In order to obtain the desired porosity, the inorganic pigments described above are utilized as primary particles. In another embodiment, the second or more inorganic particles are selected to form a coating structure with higher porosity. An example of such inorganic pigments which can form a higher porosity coating structure is structured kaolin clay. Structured kaolin clay particles can be formed by well known techniques, such as by subjecting hydrous clays to calcination at an elevated temperature or to chemical treatments. This process binds the clay particles to each other to form larger aggregate clay particles having the result to increase the void volume.

Further, in another embodiment, the inorganic pigments are porous inorganic pigments. Porous inorganic pigments refers to pigment that include a plurality of pore structures to provide a high degree of absorption capacity for liquid ink vehicle via capillary action or other similar means. Examples of porous inorganic pigments include, but are not limited to, synthesized amorphous silica, colloidal silica, alumina, colloidal alumina, and pseudoboehmite (aluminum oxide/hydroxide). In another embodiment, the porous inorganic pigments are mixed with low surface area inorganic pigments and/or organic pigments at a weight percent ratio raging from about 5% to about 40% of porous inorganic pigments. This mixture has the benefit of improving the ink absorption while not sacrificing other physical performance attributes such as gloss.

In another embodiment, the coating composition includes a white pigment. In another embodiment, such a white pigment is a porous inorganic pigment. Such porous inorganic pigment has excellent water absorption since drying properties and absorptivity of inks for ink jet printers. Examples of porous inorganic pigments include, but are not limited to, porous synthetic amorphous silica, porous magnesium carbonate, porous alumina, or the like.

In an embodiment, the pigments particles are made into a special form, such as slurries or dispersions, for further coating processing. In an embodiment, these slurries or dispersions are distributed pigment particles in an aqueous dispersion fluid. Indeed, without such specific from, pigment particles, for thermodynamic reasons, tend to coagulate especially in presence of an electrolyte like metallic salt.

Thus, in an embodiment, the coating composition includes pigments or a mixture of pigments, in the form of a pigment slurry or pigment dispersion. The pigments or a mixture of pigments in form of a slurry or a dispersion are very sensitive in terms of coagulation to the metal ionics. Thus, in an embodiment, the coating composition contains, at least, a surface active substance. In an embodiment, such surface active substance is selected from chemical compounds with high molecular weight, and, in another embodiment, is selected from natural macromolecules, which include, but not limited to casein, soy protein, polysaccharides, cellulose ethers, alginates, virgin and modified starches. In an embodiment, the surface active substance is a polymeric stabilizer. In an embodiment, the surface active substance is starch. Examples of starches include corn starch, tapioca starch, wheat starch, rice starch, sago starch and potato starch. It is believed that the molecular weight of these surface active substances is linked with the formation of a stable and coatable coating composition. Thus, the coating composition contains, at least, a surface active substance in view of avoiding the coagulation of the pigment particles. In an embodiment, the surface active substance has molecular weight which ranges from 40,000 to 850,000. In another embodiment, the starch or modified starch has a molecular weight which ranges from 40,000 to 850,000. Indeed, it is believed that too low of a molecular weight will reduce the stability of the slurry and dispersion while too high of a molecular weight can create adversely high viscosity issue(s) to compromise the coatability.

In one embodiment, the coating composition includes modified starch. Such modified starch includes, but is not limited to, enzyme modified starch, thermal and thermal-chemical modified starch and chemical modified starch. In another embodiment, the chemical modified starch is selected from chemically converted starches such as acid fluidity starches, oxidized starches and pyrodextrins; derivatized starches such as hydroxyl-alkylated starches, cyanoethylated starch, cationic starch ethers, anionic starches, starch esters, starch grafts, and hydrophobic starches. In an embodiment, the ratio of polymeric stabilizer by weight of the total weight of pigments ranges from about $1/20$ to about $1/5$.

In an embodiment, the present disclosure includes a metal containing polymeric complex. In an embodiment, the metal containing polymeric complex is prepared and then mixed into the coating composition to function as both binder and ink fixative. Thus, in an embodiment of the present invention, the coating composition includes a metal containing polymeric complex which is prepared separately and before being mixed with pigment slurry. Thus, in an embodiment, the present disclosure refers to a coating composition including pigments or a mixture of pigments, a surface active substance, and a metal containing polymeric complex wherein such a metal containing polymeric complex is made by, firstly, mixing a polymeric latex, a polyvinyl alcohol (PVA) which has a molecular weight in the range of from about 10,000 to about 65,000 and a metallic salt, and, secondly, adding the pigments or a mixture of pigments.

In an embodiment, the polymeric latex refers herein to a group of preparations consisting of stable dispersions of polymeric micro-particles dispersed in an aqueous matrix. In an embodiment, the polymeric latex is natural latex or synthetic latex. Synthetic latexes are, usually, produced by emulsion polymerization using a variety of initiators, surfactants and monomers. There is no specific limitation on chemical composition of latex. Furthermore, there is no limitation of the surface charge of the polymeric latex. In an embodiment, the polymeric latex is a cationic, an anionic or amphoteric polymeric latex. In another embodiment, the polymeric latex is selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers.

In an embodiment, the metal containing polymeric complex is capable to form film under the drying condition to perform the binding function. The capability of the film forming is characterized by the MFFT (minimum film forming temperature). Due to existing of low molecular PVA in the complex, the MFFT of the metal containing polymeric complex is expected to be lower than that of latex which composes of. The MFFT is defined as the minimum temperature at which a waterborne synthetic latex or emulsion will coalesce when laid on a substrate as a thin film. The MFFT is determined by the use of a MFFT Bar according to a method of ASTM D 2354. In an embodiment, the MFFT (minimum film forming temperature) of the metal containing polymeric complex is not greater than 50° C. In another embodiment, the MFFT (minimum film forming temperature) of the metal containing polymeric complex is between about −10° C. and about 30° C. However, it has to be noted that a metal containing polymeric complex having a too low MFFT will result a film with poor film strength which adversely reduces binding strength.

In an embodiment, the organic compound present in the metal containing polymeric complex is a polyvinyl alcohol group having a specific molecular length. In an embodiment of the present disclosure, the molecular weight of the polyvinyl alcohol is in the range of 10,000 to 65,000. In another embodiment, the molecular weight of the polyvinyl alcohol is in the range of about 20,000 to about 65,000.

Indeed, it is believed that it is within this molecular weight that the PVA ensures the desirable stability, good binding capability and suitable rheology to the coating composition. Furthermore, it is believed that if the PVA molecular weight is too low, the polymeric latex will adversely react with metallic salt and will result precipitation. In addition, it is believed that if the PVA molecular weight is high, it will cause gel formation which will adversely change the rheology of the coating composition. In an embodiment, polyvinyl alcohol is produced commercially from polyvinyl acetate, usually by a continuous process. The acetate groups are hydrolyzed by ester interchange with methanol in the presence of anhydrous sodium methylate or aqueous sodium hydroxide. The physical characteristics and its specific functional uses depend on the molecular weight and the degree of hydrolysis. In an embodiment of the present disclosure, there is no specific requirement on the degree of hydrolysis of polyvinyl alcohol. In another embodiment, the degree of hydrolysis of polyvinyl alcohol varies from about 60% to about 99%.

In an embodiment, the coating composition includes pigments or a mixture of pigments, a surface active substance and a metal containing polymeric complex. Such metal containing polymeric complex is formed from, at least, a metallic salt, a polymeric latex and a polyvinyl alcohol (PVA) which has a molecular weight in the range of from about 10,000 to about 65,000.

In an embodiment, the metallic ionic coordinated with polymeric latex and organic PVA is provided from metallic salts. In an embodiment, metallic salts are water-soluble metallic salts. In another embodiment, the metallic salts are mono- or multi-valent metallic salts. Examples of such metallic salt include Group I metals, Group II metals, and Group III metals. The metallic salts may include cations of monovalent metal ions, multiple valent metal ions, combinations and derivatives. In one embodiment, the metallic salt is metallic cation. Examples of such metallic cation include, but are not limited to, sodium, calcium, copper, nickel, magnesium, zinc, barium, iron, aluminum and chromium ions. In another embodiment, the metallic cation is selected for the group consisting of calcium, magnesium, aluminum, any combinations thereof and derivatives. In another embodiment, the metallic salt is metallic anions. Examples of such metallic anions include, but are not limited to, fluoride, chloride, iodide, bromide, nitrate, chlorate, and acetate ions, and combinations thereof. Metallic anions which are known to readily interact with and bind with the paper pulp are excluded from use. Such metallic anions include, as non-limiting examples, anions based on sulfur and on phosphorous. Without being bound by the theory, it is believed that such metallic salts improve the total image quality as the salts interact with the pigment particles of the ink solution so that the pigmented colorant is substantially fixed and substantially stays on the outmost surface layer of the media substrate. As an example, cations of salts further fix anionic charged colorants in pigmented ink.

In an embodiment, the metallic salt is present in the composition in the ratio of from about 1/20 to 1/4 by weight of the total weight of inorganic pigments including both primary and optional secondary pigments from pigments mixture. In an embodiment, the ratio of metallic salt, by weight to the total weight of inorganic pigments is in the range of from about 1/15 to 1/5. In an embodiment, metallic salts are multi-valent salts. In another embodiment, the coating composition contains calcium chloride as metallic salts.

In another embodiment, the metal containing polymeric complex includes a central polymeric latex which is weakly connected and surrounded with organic molecules and coordinates with metal ionic. In an embodiment, such organic molecules are polyvinyl alcohols (PVA). Such metal containing polymeric complex includes, at least, a polymeric latex and a polyvinyl alcohol (PVA) and a metallic salt. In an embodiment, in the metal containing polymeric complex, the compounding ratio, in weight, between polymeric latex to polyvinyl alcohol ranges from 1.4/1 to 2.5/1 by dry weight. In an embodiment, the metal containing polymeric complex is present in the composition in an amount representing from about 3 wt % to about 12 wt %, by weight of the coating composition. In another embodiment, the metal containing polymeric complex is present in the composition in an amount representing from about 6 wt % to about 9 wt %, by total weight of the coating composition.

In an embodiment, the metal containing polymeric complex includes polymeric latex, PVA and a metallic salt. The metal containing polymeric complex has a Zeta potential value which is within the range of from +/−15 millivolts and; in another embodiment, within the range of from about −8 to about +8 millivolts. Indeed, it is believed that a Zeta potential ranging beyond that range will yield the possibility of either unstable complex when the Zeta potential is too low or coagulate the pigment particles when later mixed with pigment slurry if the Zeta potential is too high. The Zeta potential is the potential across the interface of solids and liquids, and more specifically, the potential across the diffuse layer of ions surrounding a charged colloidal particle which is largely responsible for colloidal stability. Zeta potentials can be calculated from electrophoretic mobility, namely, the rates at which colloidal particles travel between charged electrodes placed in the dispersion, emulsion or suspension containing the colloidal particles, and can be also measured under fixed pH value using a Zeta Sizer. This was carried out by diluting 1 or 2 drops of the dispersion in 100 ml of deionized water and adjusting the pH to a constant value.

In another embodiment, the Zeta potential of the metal containing polymeric complex is constant across wide pH range. Indeed, it is within this specific Zeta potential range that the metal containing polymeric complex provide good coating quality and excellent printing image quality when used in coating composition.

Thus, in an embodiment, the change in Zeta potential, from acidic to alkaline environment is less than 10 millivolts; in another embodiment, is less than 5 millivolts. Thus, in another embodiment, the metal containing polymeric complex has an average Zeta potential which ranges from about 0 to about −5 millivolts.

In an embodiment of the present invention, the metal containing polymeric complex is prepared and then mixed into the coating composition to function as both binder and ink fixative. Thus, in an embodiment of the present invention, the coating composition includes a metal containing polymeric complex which is prepared separately and before being mixed with pigment slurry.

Thus, in an embodiment, the present disclosure refers to a coating composition including pigments or a mixture of pigments, a surface active substance, and a metal containing polymeric complex wherein such a metal containing polymeric complex is made by, firstly, mixing a polymeric latex, a polyvinyl alcohol (PVA) which has a molecular weight in the range of from about 10,000 to about 65,000 and a metallic salt, and, secondly, adding the pigments or a mixture of pigments.

In another embodiment, the present disclosure refers to coating composition obtainable according to the process containing the steps of: firstly, preparing the metal containing polymeric complex by mixing, under agitation, the polyvinyl alcohol and the polymeric latex, then by adding the metallic salt is added under strong shear stirring; and secondly, mixing the metal containing polymeric complex with a pigment slurry that has been pre-mixed with polymeric surface active agents.

According to embodiments of the present invention, the coating composition includes a metal containing polymeric complex which is prepared separately, and before being, mixed with pigment slurry. In an embodiment, after adding the metallic salt to polymeric complex mixture under mechanical shear force, the metal containing polymeric complex is formed.

In an embodiment, the present disclosure relates to a method of making the coating composition. Thus, in another embodiment, the coating composition is made according to a method that includes several steps. According to this method, the metal containing polymeric complex is pre-prepared before making coating composition, in which polyvinyl alcohol and the polymeric latex are, firstly, mixed under agitation. Then, the metallic salt is added under strong shear stirring to form metal containing polymeric complex. Such a metal containing polymeric complex can be then blended into the mixing tank where the pigment slurry is pre-mixed with polymeric surface active agents, without cause any precipitation or gelling. Alternatively the pre-dispersed pigment slurry, which is pre-mixed with polymeric surface active agents, can also be mixing into the metal containing polymeric complex without cause any precipitation or gelling.

In an embodiment of the present disclosure, the coating composition contains other coating additives in addition to pigments, surface active substance and metal containing polymeric complex. Non-limiting examples of such coating additives include: wetting agents, de-foaming agents, anti-foaming agents and dispersing agents. Such coating additives may be incorporated to improve the coating composition properties. In another embodiment, the viscosity of the coating solution is from about 200 centipoise to about 1500 centipoise at a solid content of about 40 to about 70 percent by weight. In an embodiment of the present disclosure, the coating composition is a liquid composition. In another embodiment, the coating composition contains a liquid vehicle. In an embodiment, the liquid vehicle is water. As used herein, the term "liquid vehicle" is defined to include liquid compositions that can be used to carry pigments, to a substrate. Liquid vehicles are well known in the art, and a wide variety of liquid vehicle components may be used in accordance with embodiments of the present exemplary system and method. Such liquid vehicles may include a mixture of a variety of different agents, including without limitation, surfactants, co-solvents, buffers, biocides, viscosity modifiers, sequestering agents, stabilizing agents, and water.

In an embodiment of the present invention, the coating composition is used for the coating of substrate in view of making a media sheet. In another embodiment, the coating composition may be used for the coating of paper substrate. The coating composition, according to one embodiment of the present invention, forms an image-receiving layer (or coating) on the substrate. The combination of substrate and image-receiving layer results in a media sheet. Therefore, in an embodiment, the media sheet includes a substrate and a coating composition disposed on the substrate. The coating composition includes pigments, a surface active substance, and metal containing polymeric complex which is made from metallic salts, polymeric latex and polyvinyl alcohol. Such polyvinyl alcohol has a molecular weight in the range of from about 10,000 to about 65,000.

In an embodiment, the coating composition, present on the media sheet, has a coat weight which is in the range of about 2 to about 30 gram per square meter ($g/m^2$); in an embodiment, the coating composition has a coat weight which is in the range of about 3 to about 20 gram per square meter ($g/m^2$).

In an embodiment of the present invention, the substrate (or receiver, or base, or base stock) can be of any type and size. In another embodiment, the substrate includes any substrate that is suitable for use in digital color imaging devices, such as electrophotographic and/or inkjet imaging devices, including, but in no way limiting to, resin coated papers (so-called photo-based papers), papers, overhead projector plastics, coated papers, fabrics, art papers (e.g., water color paper), plastic film of any kind and the like. The substrate includes porous and non-porous surfaces. In another embodiment, the substrate is paper (non-limitative examples of which include plain copy paper or papers having recycled fibers therein) or photo-paper (non-limitative examples of which include polyethylene or polypropylene extruded on one or both sides of paper), and/or combinations thereof.

Papers are often made from cellulose fiber pulps. Papers can be classified as chemical pulp or mechanical pulp (i.e., wood containing pulps). Chemical pulp refers to pulp that has been subjected to a chemical process where the heat and chemicals break down the lignin (the substance that binds the cellulose fibers together) without seriously degrading the cellulose fibers. This process removes the lignin from the pulp to thereby yield cellulose fibers with very small amount of lignin. In mechanical pulp production, the logs of wood are pressed on grinding stones by means of mechanical presses. The wood is split into fibers with the help of water. As a result of which, the wood fibers are released but still contain a large variety of contaminants. The mechanical pulp can be further divided into groundwood pulp and the thermo-mechanical pulp (TMP). TMP pulp may be chemically enhanced in some cases, and in such cases, it is referred to as chemo-thermo-mechanical pulp (CTMP).

In an embodiment, the substrate has a thickness along substantially the entire length ranging between about 0.025 mm and about 0.5 mm. In another embodiment, the substrate is a paper substrate. In an embodiment, cellulose paper stock is used for making substrate. Any kind of cellulose paper stock may be used, such as paper stock made from wood or non-wood pulps. Non-limiting examples of suitable pulps include mechanical wood pulp, chemically ground pulp, chemical-mechanical pulp, thermal-mechanical pulp, recycled pulp and/or mixtures thereof. In an embodiment, the substrate is a paper substrate made with wood pulp.

In one embodiment, the coating compositions are coated on substrates in view of forming media sheet; in an embodiment on paper substrate, using any method known in the art. Non-limitative examples of methods include size press, slot die, blade coating and Meyer rod. The size presses include puddle-sized press, film-sized press and the like. The puddle-size press may be configured as having horizontal, vertical, or inclined rollers. The film-sized press may include a metering system, such gate-roll metering, blade metering, Meyer rod metering, or slot metering. In an embodiment, a film-sized press with short-dwell blade metering may be used as an application head in view of applying the coating composition. In another embodiment, a film-sized press is used to apply the coating composition to a paper substrate. The coating composition can be applied to paper substrate off-line or in-line of a paper-making machine. Subsequently, the coating composition (image-receiving layer) is dried, e.g., using infrared heating or heated air or a combination thereof. Other conventional drying methods and equipment can also be used as known in the art. For one embodiment, substrate with image-receiving layer formed thereon is passed between a pair of rollers, as part of a calendering process, after drying image-receiving layer. The calendering device can be any kind of calendaring machine including but not limited to, off-line super-calender, on-line, soft-nip or hard-nip calender, or the like.

In an embodiment of the present invention, the media sheet is formed by a method including the step of: providing a substrate, then coating the substrate with a coating composition such as described above in view of obtaining an image receiving layer. The coating composition includes pigments or a mixture of pigments, a surface active substance, and a metal containing polymeric complex, such polymeric complex is formed from a metallic salt, a polymeric latex, and a polyvinyl alcohol (PVA) which has a molecular weight in the range of from about 10,000 to about 65,000.

In one embodiment, image-receiving layer is formed either on opposing (upper and lower or wire and felt) surfaces of substrate, or on one of the surfaces of substrate. In one embodiment, image-receiving layer has a gloss level of about 30 to about 90 percent, as measured at a TAPPI (Technical Association of the Pulp and Paper Industry) angle of 75 degrees. In one embodiment, image-receiving layer is formed on substrate with a dried coating weight of about 3 to about 20 gram/m$^2$, and preferably from about 6 to about 15 gram/m$^2$. The quality of digital printing typically depends on the smoothness, both in micro and larger scale, of the media sheet and the ability of the media to absorb ink or to evenly distribute toner to give high gloss uniformity. Without being bound to the theory, the coating composition when applied to substrate, acts to reduce the non-uniformity in the surface roughness, while providing suitable ink absorption or toner adhesion to the resulting media sheet. Furthermore, the coating composition further acts to increase the opacity, brightness, whiteness, glossiness, and surface smoothness of image-receiving layer. Increasing the opacity reduces thus the likelihood of an image formed on one side of the media sheet from being visible on an opposite side of the media sheet.

The following examples illustrate a number of embodiments of the present systems and methods that are presently known. However, it is to be understood that the following are only exemplary or illustrative of the application of the principles of the present systems and methods. Numerous modifications and alternative compositions, methods, and systems may be devised by those skilled in the art without departing from the spirit and scope of the present systems and methods. The appended claims are intended to cover such modifications and arrangements. Thus, while the present systems and methods have been described above with particularity, the following examples provide further detail in connection with what are presently deemed to be the acceptable embodiments.

EXAMPLE 1

Preparation of Metal Containing Polymeric Complex

Various polyvinyl alcohols (Celvol® or Mowiol®) powder is precooked to convert the powder as received into PVA solution. The precooking was carried out in 90-105° C. for one hour with stirring until no any solid particles existing in the solution. The 10 parts (dry weight) of polymer latex trade named Dow® XU31264.50 was firstly charged into a mixing tank and then mixed with the PVA solution (3 parts dry weight) with stirring. After 30 minutes a solution (10 parts dry weight) containing 32% of a salt (CaCl$_2$) was slowly added to the mixture with strong shear stirring. A metal containing polymeric complex is thus obtained. Metal containing polymeric complexes made from various types of polyvinyl alcohol were compared based on their ability to remain stable and for not precipitating after adding metallic salt solution. The results are illustrated in Table 1.

TABLE 1

| | polyvinyl alcohol | | | | | |
|---|---|---|---|---|---|---|
| Exp | Name | Molecular Wt | Hydrolysis % | polymeric latex | Metallic Salt | Results |
| 1A | Celvol ® 107 | 31,000 | 98.5-99.8 | Dow ®XU31264.50 | 32% CaCl2 solution | No precipitation |
| 1B | Celvol ® 203 | 13,000 | 80 | Dow ®XU31264.50 | 32% CaCl2 solution | No precipitation |
| 1C | Mowiol ® 3-83 | 20,000 | 83 | Dow ®XU31264.50 | 32% CaCl2 solution | No precipitation |
| 1D | Mowiol ® 4-98 | 25,000 | 98 | Dow ®XU31264.50 | 32% CaCl2 solution | No precipitation |
| 1E | Mowiol ® 6-98 | 42,000 | 98 | Dow ®XU31264.50 | 32% CaCl2 solution | No precipitation |
| Comparative Exp 1 | Mowiol ® 15-99 | 65,000 | 99 | Dow ®XU31264.50 | 32% CaCl2 solution | No precipitation but viscosity increased |
| Comparative Exp 2 | Mowiol ® 15-79 | 65,000 | 79 | Dow ®XU31264.50 | 32% CaCl2 solution | Slightly precipitation and viscosity increased |

TABLE 1-continued

| | | polyvinyl alcohol | | | | |
|---|---|---|---|---|---|---|
| Exp | Name | Molecular Wt | Hydrolysis % | polymeric latex | Metallic Salt | Results |
| Comparative Exp 3 | Mowiol ® 45-99 | 148,000 | 99 | Dow ®XU31264.50 | 32% CaCl2 solution | precipitation |
| Comparative Exp 4 | None | N/A | N/A | Dow XU31264.50 | 32% CaCl2 solution | precipitation |

EXAMPLE 2

Zeta Potential of Metal Containing Polymeric Latex at Different pH

Zeta potential of the metal containing polymeric complex of Example 1C, of Example 1, is measured under different pH using Zeta Sizer (Nano Series) Model ZEN3600, supplied by Malvern Instruments. The viscosities are also measured at 100 RPM, in cps, using a 2# Brookfield spindle. The pH is adjusted by the solution of either NaOH or HCl. The results are shown in Table 2.

These results demonstrate that a relative constant zeta potential is obtained across wide pH range in metal containing polymeric latex obtained according to Example 1C. The polymer latex binder (Dow® XU31264.50 only) was used as the comparative control.

TABLE 2

| pH | Zeta Potential (mV) | Viscosities (CPs at 100 RPM) |
|---|---|---|
| Example 1C | | |
| 4.46 | −2.17 | 30.3 |
| 4.96 | −2.31 | 20.7 |
| 5.45 | −3.43 | 20.1 |
| 5.89 | −2.89 | 23.4 |
| 6.39 | −3.09 | 23.1 |
| 6.93 | −3.13 | 22.8 |
| 7.72 | −2.39 | 23.4 |
| 8.21 | −2.94 | 24.9 |
| 8.53 | −3.27 | 22.5 |
| 8.86 | −3.26 | 23.8 |
| 9.3 | −3.38 | 20.4 |
| Control: Dow ®XU31264.50 only | | |
| 6.09 | −45.1 | 170 |

EXAMPLE 3

Example of Coating Compositions

The following are examples of coating formulations. All parts numbers are based on the amount of dry chemicals, with the sum of the pigment equal to 100 parts.

a) Coating Composition A

| | |
|---|---|
| Foamaster VF ® | 0.2 parts by wt |
| Covercarb 85 ® | 80 parts by wt |
| Hydralux 91 ® | 20 parts by wt |
| Penford gum 280 | 10 parts by wt |
| Leucophor NS LIQ ® | 5 parts by wt |
| Metal containing polymeric complex according to Example 1C | 23 parts by wt | b) Coating Composition B (Comparative)

| | |
|---|---|
| Foamaster VF ® | 0.2 parts by wt |
| Covercarb 85 ® | 80 parts by wt |
| Hydralux 91 ® | 20 parts by wt |
| Leucophor NS LIQ ® | 5 parts by wt |
| Penford ®gum 280 | 10 parts by wt |
| Dow ®XU31264.50 | 10 parts by weight | c) Coating Composition C (Comparative)

| | |
|---|---|
| Foamaster VF ® | 0.2 parts by wt |
| Covercarb 85 ® | 80 parts by wt |
| Hydralux 91 ® | 20 parts by wt |
| Penford ®gum 280 | 10 parts by wt |
| Leucophor NS LIQ ® | 5 parts by wt |
| Dow ®XU31264.50 | 10 parts by weight |
| Mowiol ®3-83 | 5 parts | d) Coating Composition D (Comparative)

| | |
|---|---|
| Foamaster VF ® | 0.2 parts by wt |
| Covercarb 85 ® | 80 parts by wt |
| Hydralux 91 ® | 20 parts by wt |
| Leucophor NS LIQ ® | 5 parts by wt |
| Metal containing polymeric complex according to Example 1C | 23 parts by wt |

Mowiol® is polyvinyl alcohol, available from Clariant Corporation. Celvol® is polyvinyl alcohol, available from Celanese Chemicals. Foamaster VF® is a petroleum derivative surfactant, available from Cognis Corporation. Covercarb 85® is a calcium carbonate, available from Omya Corporation. Ansilex 93® is calcined kaolin clay, available from Engelhard Corporation. Dow® XU31264.50 is a polymer latex from Dow Chemical Company. Hydralux 91® is kaolin clay, available from J. M. Huber Corporation. Calcium chloride is available from Sigma Aldrich. Leucophor NS LIQ® is optical brightness agent (OBA) from Clariant Corporation. Hydrocarb® 90 is calcium carbonate pigment available from Omya. Extra White® is an optical brightener agent available from Nalco Company. Penford Gum 280 is a hydroxyethylated cornstarch commercially available from Penford Products.

The coating compositions of Examples 3 were prepared in the laboratory using a 55 gal jacked processing vessel made of stainless steel (from A&B Processing System Corp., Stratford, Wash.). A Lighthin mixer (from Lighthin Ltd, Rochester N.Y.) with gear ratio 5:1 and a speed of 1500 rpm was used to mix the compositions. The comparative composition D, which does not contains any surface active agent, results in a composition which, during mixing, have a very high viscosity and is therefore not coatable. Coating compositions A, B and C can be effectively prepared and meet the rheology conditions for paper coating.

EXAMPLE 4

Paper Coating and Image Testing

The coating compositions 3A, 3B and 3C (of Example 3) were applied on a TMP base paper, on both sides of a base paper to form a coating layer on each side. The coating process was accomplished either in small quantities by hand drawdown using a Mayer rod in a plate coating station, or in a large quantity by a pilot coater equipped with film sizing press in view of producing a media sheet having improved sheet quality and printing properties. The coat weight was 10-15 g/m$^2$ per side. The paper samples were then printed using a high speed web inkjet printer HT300 (from Hewlett-Packard Company) equipped with pigmented inks.

After printing, the image quality of the prints, including Color Gamut Volume, black optical density (KOD), Edge acuity, Color-to-Color bleed, Whiteness and Brightness was evaluated. The results are expressed in Table 3 below.

Color Gamut Volume measures the volume of color space enclosed inside the achievable colors (boundary color space was measured with 8-points L*, a*, b* measurement; the 8-point consists of imaging of 100% solid-fill black, 100% solid-fill cyan, 100% solid-fill magenta, 100% solid-fill yellow, solid-fill red (from 100% yellow and 100% magenta), solid-fill green (from 100% cyan and 100% yellow), solid-fill blue (from 100% cyan and 100% magenta)). Spectro-densitometer Model 938, supplied by X-rite, was used as the instrument to measure color gamut volume. The setting used was: D65/2°. The result is reported as an average from 3 measurements.

The KOD measures the black optical density. The KOD was measured by Spectro-densitometer Model 938 supplied by X-rite. The setting used was: ANSI status A. The result is reported as an average from 3 measurements.

The edge acuity, expressed in micrometer, measures the appearance of geometric distortion of an edge from its ideal position, a ragged edge appears rough or wavy rather than smooth or straight. The measure of edge acuity is the standard deviation of the residuals from a line fitted to the edge threshold of the line (calculated perpendicular to the fitted line). Edge acuity is measured with black line of 1 mm in theoretical width at vertical position. The measurement was done on Personal Image Analysis System provided by Quality Engineering Associates (QEA). The result is reported as an average from 6 measurements.

The Color-to-Color, expressed in micrometer, bleed measures the edge acuity multiple ink film layers from different colors. Black-over-yellow (1 mm width black line over solid fill area yellow) is chosen as the representative measure. The measurement was done on Personal Image Analysis System provided by Quality Engineering Associates (QEA). The result is reported as an average from 6 measurements.

The Whiteness measures the white shade of paper. The setting used was Indoor CIE Ganz D65/10° without UV. Color-Eye 7000 supplied by Macbeth was used for the measurement. The result is reported as an average from 3 measurements.

The Brightness measures the brightness of paper. The setting used was: TAPPI T452. Brightmeter Profile Plus supplied by Technidyne was used for the measurement. The result is reported as an average from 3 measurements.

The sample 3A was coated with coating composition A of example 3. The comparative sample 3B was coated with coating composition B of example 3. The comparative sample 3C was coated with coating composition C of example 3.

TABLE 3

| Sample | Gamut volume | KOD | Edge acuity | Color-to-Color bleed | CIE whiteness | TAPPI Brightness |
|---|---|---|---|---|---|---|
| Sample 3A | 197 | 1.48 | 6 | 27 | 94 | 89 |
| Sample 3B | 84 | 0.96 | 20 | 25 | 81 | 77 |
| Sample 3C | 103 | 1.01 | 24 | 28 | 81 | 77 |

These data demonstrate that: Sample 3A shows excellent color gamut volume, excellent KOD, excellent edge acuity, and good color-to-color bleed—all print qualities showing the best performance, while showing the highest whiteness and brightness, among the three compared samples. Sample 3B shows inferior print qualities, inferior whiteness and brightness by comparison with sample 3A. Sample 3C demonstrate inferior print quality, whiteness, and brightness by comparison with sample 3A.

The preceding description has been presented only to illustrate and describe exemplary embodiments of the present invention. It is not intended to be exhaustive or to limit the system and method to any precise form disclosed. Many modifications and variations are possible in light of the above teaching. It is intended that the scope of the invention be defined by the following claims.

The invention claimed is:

1. A coating composition, comprising:
   a. a pigment slurry comprising at least one pigment and a surface active substance, wherein the surface active substance comprises natural macromolecules having a molecular weight from 40,000 to 850,000, and
   b. a metal-containing polymeric complex, such metal-containing polymeric complex formed from at least:
      i. a metallic salt,
      ii. a polymeric latex, and
      iii. a polyvinyl alcohol (PVA) which has a molecular weight in the range of from about 10,000 to about 65,000;
   wherein the pigment slurry and metal-containing polymeric complex are prepared separately before being mixed, such that the coating composition exhibits no precipitation or gelling.

2. The coating composition according to claim 1 wherein the pigment slurry comprises at least one white pigment.

3. The coating composition according to claim 1 wherein the surface active substance is selected from the group consisting of casein, soy protein, polysaccharides, cellulose ethers, alginates, starch, enzyme modified starch, thermal modified starch, thermal-chemical modified starch, and chemical modified starch.

4. The coating composition according to claim 1 wherein the surface active substance is starch, enzyme modified starch, thermal modified starch, thermal-chemical modified starch, or chemical modified starch.

5. The coating composition according to claim 1 wherein the metal-containing polymeric complex is present in the composition in an amount of from about 3 wt. % to about 12 wt. % based on the coating composition.

6. The coating composition according to claim 1 wherein the metal-containing polymeric complex has an average Zeta potential which ranges from about 0 to about-5 millivolts.

7. The coating composition according to claim 1 wherein the metal-containing polymeric complex has a MFFT (minimum film forming temperature) between −10° C. and 30° C.

8. The coating composition according to claim 1 wherein, in the metal-containing polymeric complex, the compounding ratio, in weight, of polymeric latex to polyvinyl alcohol ranges from 1.4/1 to 2.5/1 by dry weight.

9. The coating composition according to claim 1 wherein the polymeric latex is selected from the group consisting of an acrylic polymer, an acrylic copolymer, a vinyl acetate polymer, a vinyl acetate copolymer, a polyester polymer, a polyester copolymer, a vinylidene chloride polymer, a vinylidene chloride copolymer, a butadiene polymer, a butadiene copolymer, a styrene butadiene polymer, a styrene butadiene copolymer, an acrylonitrile butadiene polymer, an acrylonitrile butadiene copolymer, and combinations thereof.

10. The coating composition according to claim 1 wherein the polyvinyl alcohol has a high degree of hydrolysis from about 60% to about 99%.

11. The coating composition according to claim 1 wherein the metallic salt includes a metallic cation selected from the group consisting of calcium, magnesium, and aluminum.

12. The coating composition according to claim 1 wherein the metallic salt is present in the composition at a ratio of from about 1/20 to about 1/4 by weight of metallic salt to the total weight of pigments in the pigment slurry.

13. The coating composition according to claim 1 wherein the metallic salt is calcium chloride.

14. The coating composition according to claim 1 wherein the surface active substance is selected from the group consisting of corn starch, tapioca starch, wheat starch, rice starch, sago starch, and potato starch.

15. The coating composition according to claim 1 wherein the at least one pigment is an organic pigment.

16. A method of making the coating composition according to claim 1 wherein, firstly, the polyvinyl alcohol and the polymeric latex are mixed, then the metallic salt is added to this mixture to form the metal-containing polymeric complex; then, secondly, the metal containing polymeric complex is added to the pigment slurry.

17. A media sheet comprising a substrate and the coating composition according to claim 1 disposed on the substrate.

18. A method of forming a media sheet comprising: providing a substrate and coating said substrate with the coating composition according to claim 1.

* * * * *